United States Patent
Hu

(10) Patent No.: US 10,778,571 B2
(45) Date of Patent: Sep. 15, 2020

(54) FLOW ENTRY TIMING PROCESSING METHOD AND APPARATUS

(71) Applicant: Huawei Technologies Co., Ltd., Shenzhen, Guangdong (CN)

(72) Inventor: Weiqi Hu, Shenzhen (CN)

(73) Assignee: HUAWEI TECHNOLOGIES CO., LTD., Shenzhen, Guangdong (CN)

(*) Notice: Subject to any disclaimer, the term of this patent is extended or adjusted under 35 U.S.C. 154(b) by 168 days.

(21) Appl. No.: 15/867,423

(22) Filed: Jan. 10, 2018

(65) Prior Publication Data

US 2018/0131623 A1    May 10, 2018

Related U.S. Application Data

(63) Continuation of application No. PCT/CN2015/084491, filed on Jul. 20, 2015.

(51) Int. Cl.
*H04L 12/721* (2013.01)
*H04L 12/24* (2006.01)
*H04L 12/841* (2013.01)

(52) U.S. Cl.
CPC ........ *H04L 45/38* (2013.01); *H04L 41/0836* (2013.01); *H04L 47/28* (2013.01)

(58) Field of Classification Search
CPC ..... H04L 47/28; H04L 47/283; H04L 47/286; H04L 41/0836; H04L 41/0823; H04L 45/38; H04L 45/745; H04L 12/6418
See application file for complete search history.

(56) References Cited

U.S. PATENT DOCUMENTS

| | | | |
|---|---|---|---|
| 2014/0301226 A1 | 10/2014 | Choi et al. | |
| 2014/0369228 A1* | 12/2014 | Sampath | H04L 43/0894 370/253 |
| 2015/0036498 A1* | 2/2015 | Ehara | H04L 47/12 370/235 |
| 2015/0156107 A1 | 6/2015 | Li et al. | |

(Continued)

FOREIGN PATENT DOCUMENTS

| CN | 103685009 A | 3/2014 |
|---|---|---|
| CN | 104113482 A | 10/2014 |

(Continued)

OTHER PUBLICATIONS

Office Action, dated Apr. 3, 2019, in Chinese Application No. 201580065539.8 (8 pp.).

(Continued)

*Primary Examiner* — Min Jung
(74) *Attorney, Agent, or Firm* — Womble Bond Dickinson (US) LLP

(57) ABSTRACT

A flow entry timing processing method and an apparatus are provided, and relate to the computer field, to resolve a prior-art problem that processing time of a flow entry is not accurate enough. The method includes: receiving, by a forwarding plane device, a flow rule message sent by a control plane device, where the flow rule message includes an ineffective time of a flow entry and a time type identifier of the ineffective time; and when the time type identifier indicates that the ineffective time is an ineffective moment of the flow entry, performing, by the forwarding plane device, ineffectiveness processing on the flow entry according to the ineffective moment.

12 Claims, 5 Drawing Sheets

A forwarding plane device receives a flow rule message sent by a control plane device, where the flow rule message includes ineffective time of a flow entry and a time type identifier of the ineffective time — S201

If the time type identifier indicates that the ineffective time is an ineffective moment of the flow entry, the forwarding plane device performs ineffectiveness processing on the flow entry according to the ineffective moment — S202

(56) References Cited

U.S. PATENT DOCUMENTS

| | | | |
|---|---|---|---|
| 2015/0163114 A1* | 6/2015 | Hsiao | H04L 43/0864 370/252 |
| 2015/0195183 A1* | 7/2015 | Park | H04L 45/021 709/242 |
| 2016/0173378 A1 | 6/2016 | Ni | |
| 2016/0218957 A1 | 7/2016 | Liang et al. | |
| 2016/0254997 A1* | 9/2016 | Kurudi Matada | H04L 45/028 370/392 |
| 2017/0063689 A1* | 3/2017 | Qin | H04L 47/24 |
| 2018/0115474 A1* | 4/2018 | Hu | H04L 43/16 |

FOREIGN PATENT DOCUMENTS

| | | |
|---|---|---|
| CN | 104426815 A | 3/2015 |
| CN | 104541481 A | 4/2015 |

OTHER PUBLICATIONS

Zarek et al.; "OpenFlow Timeouts Demystified"; University of Toronto; Oct. 18, 2012; 34 pages.

Open Networking Foundation; "OpenFlow Switch Specification"; Version 1.5.0 (Protocol version 0x06); ONF TS-020; Dec. 19, 2014; 277 pages.

Zhu et al.; "Intelligent Timeout Master: Dynamic Timeout for SDN-based Data Centers"; 2015 IFIP/IEEE International Symposium on Integrated Network Management (IM); Ottawa, ON, Canada; May 11-15, 2015; 4 pages.

Liang et al.; "Effective Idle_timeout Value for Instant Messaging in Software Defined Networks"; 2015 IEEE International Conference on Communication Workshop (ICCW); London, UK; Jun. 8-12, 2015; 5 pages.

\* cited by examiner

| Header field | Counter field | Operation field | Time field |
FIG. 1
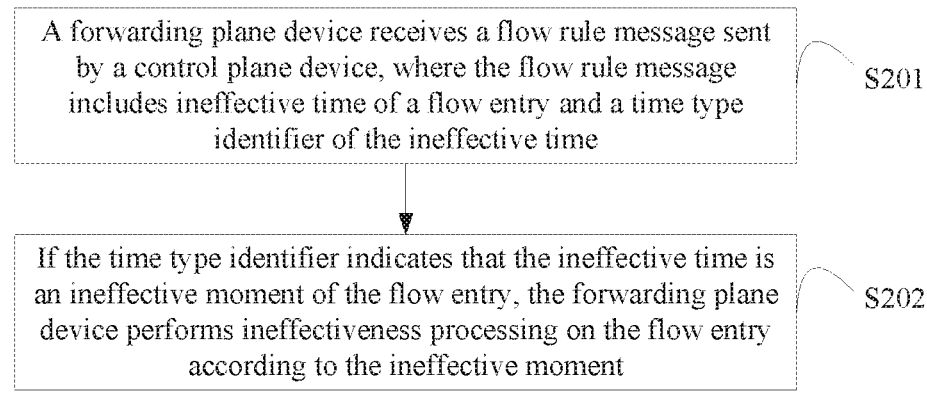
FIG. 2
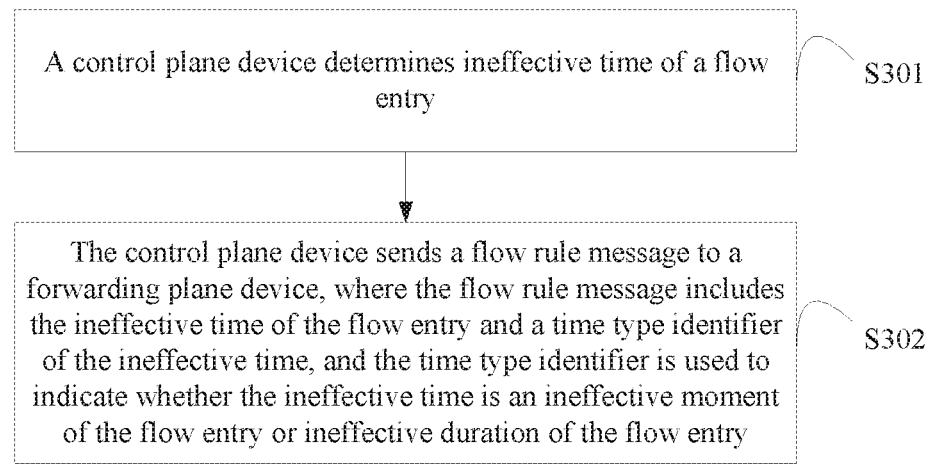
FIG. 3

FLOW ENTRY TIMING PROCESSING METHOD AND APPARATUS

CROSS-REFERENCE TO RELATED APPLICATIONS

This application is a continuation of International Application No. PCT/CN2015/084491, filed on Jul. 20, 2015, the disclosure of which is hereby incorporated by reference in its entirety.

TECHNICAL FIELD

The present application relates to the computer field, and in particular, to a flow entry timing processing method and an apparatus.

BACKGROUND

Software defined networking (SDN) is a new network architecture featuring decoupling of control and forwarding. For example, a multimedia broadcast/multicast service (MBMS) gateway in an existing enhanced multimedia broadcast/multicast service (eMBMS) system has both a control plane function and a forwarding plane function. After the SDN network architecture is used, the MBMS gateway can be decoupled into a control plane device and a forwarding plane device. The control plane device can control a behavior of the forwarding plane device by using the OpenFlow protocol.

In the OpenFlow protocol, the forwarding plane device uses flow table-based pipeline processing, and a flow table may have multiple flow entries. When the forwarding plane device receives a data packet, if a flow entry that matches the data packet exists in the flow table, the forwarding plane device forwards the data packet according to the flow entry. In this way, the control plane device can control a packet forwarding behavior of the forwarding plane device by adding, modifying, or deleting a flow entry for the forwarding plane device.

A flow entry includes a time field, and the time field records aging time of the flow entry. The forwarding plane device performs ineffectiveness processing on the flow entry at a moment specified by the aging time. In an existing solution, before a flow entry is installed, the control plane device obtains an ineffective moment of the flow entry, and uses duration between the ineffective moment and a current moment as aging time of the flow entry. However, the forwarding plane device starts timing for the aging time after the flow entry is successfully installed, not at a moment at which the control plane device starts timing for the aging time. Consequently, there is a relatively great difference between an actual ineffective moment and a desired ineffective moment of the flow entry. In addition, the OpenFlow protocol does not ensure an execution order of messages, and therefore, the control plane device cannot accurately predict a moment at which the flow entry is successfully installed. It can be learned that in the prior art, processing time of a flow entry is not accurate enough.

SUMMARY

Embodiments of the present disclosure provide a flow entry timing processing method and an apparatus, to resolve a prior-art problem that processing time of a flow entry is not accurate enough.

To achieve the foregoing objective, the following technical solutions are used in the embodiments of the present disclosure.

According to a first aspect, a flow entry timing processing method is provided, including:

receiving, by a forwarding plane device, a flow rule message sent by a control plane device, where the flow rule message includes ineffective time of a flow entry and a time type identifier of the ineffective time; and if the time type identifier indicates that the ineffective time is an ineffective moment of the flow entry, performing, by the forwarding plane device, ineffectiveness processing on the flow entry according to the ineffective moment.

With reference to the first aspect, in a first possible implementation of the first aspect, the performing ineffectiveness processing on the flow entry according to the ineffective moment includes:

when a current moment of the forwarding plane device is the ineffective moment, performing ineffectiveness processing on the flow entry; or determining, by the forwarding plane device when enabling the flow entry, duration between a current moment and the ineffective moment as first ineffective duration of the flow entry, and when detecting that the first ineffective duration ends, performing ineffectiveness processing on the flow entry.

With reference to the first aspect or the first possible implementation of the first aspect, in a second possible implementation, the flow entry is a flow entry that is already installed on the forwarding plane device but needs to be updated, the flow rule message further includes a time modification indicator, and before the performing ineffectiveness processing on the flow entry, the method further includes:

modifying, according to the time modification indicator, original aging time included in the flow entry to the ineffective moment; or modifying, according to the time modification indicator, original aging time included in the flow entry to the first ineffective duration.

With reference to any one of the first aspect to the second possible implementation of the first aspect, in a third possible implementation, the flow rule message further includes effective time of the flow entry, the effective time is an effective moment of the flow entry or effective duration of the flow entry, the effective duration is duration that is between a first moment and the effective moment and that is calculated by the control plane device, and the first moment is a moment prior to the effective moment; and before the performing ineffectiveness processing on the flow entry, the method further includes:

enabling the flow entry when the effective moment of the flow entry arrives, or when it is detected that the effective duration ends.

With reference to any one of the first aspect to the third possible implementation of the first aspect, in a fourth possible implementation, if the time type identifier indicates that the ineffective time is second ineffective duration of the flow entry, performing ineffectiveness processing on the flow entry when detecting that the second ineffective duration ends, where the second ineffective duration is duration between the effective moment and the ineffective moment, or the second ineffective duration is duration between the first moment and the ineffective moment.

With reference to any one of the first aspect to the fourth possible implementation of the first aspect, in a fifth possible implementation, the flow entry is a flow entry that is already installed on the forwarding plane device but needs to be updated, the flow rule message further includes a time modification indicator, and before the performing ineffectiveness processing on the flow entry, the method further includes:

modifying, according to the time modification indicator, original aging time included in the flow entry to the second ineffective duration.

With reference to any one of the first aspect to the fifth possible implementation of the first aspect, in a sixth possible implementation, after the receiving, by a forwarding plane device, a flow rule message sent by a control plane device, the method further includes:

verifying the ineffective time and/or the effective time; and when the verification fails, sending a verification failure message to the control plane device.

According to a second aspect, a flow entry timing processing method is provided, including:

determining, by a control plane device, ineffective time of a flow entry; and sending a flow rule message to a forwarding plane device, where the flow rule message includes the ineffective time of the flow entry and a time type identifier of the ineffective time, and the time type identifier is used to indicate whether the ineffective time is an ineffective moment of the flow entry or ineffective duration of the flow entry.

With reference to the second aspect, in a first possible implementation of the second aspect, the flow rule message further includes effective time of the flow entry, the effective time is an effective moment of the flow entry or effective duration of the flow entry, the effective duration is duration that is between a first moment and the effective moment and that is calculated by the control plane device, and the first moment is a moment prior to the effective moment, so that when the effective moment of the flow entry arrives, or when it is detected that the effective duration ends, the forwarding plane device enables the flow entry.

With reference to the second aspect or the first possible implementation of the second aspect, in a second possible implementation, the determining, by a control plane device, ineffective time of a flow entry specifically includes:

determining the ineffective duration of the flow entry, where the ineffective duration is duration between the effective moment and the ineffective moment, or the ineffective duration is duration between the first moment and the ineffective moment, so that when the time type identifier indicates that the ineffective time is the ineffective duration, the forwarding plane device performs ineffectiveness processing on the flow entry when detecting that the ineffective duration ends.

With reference to any one of the second aspect to the second possible implementation of the second aspect, in a third possible implementation, the flow entry is a flow entry that is already installed on the forwarding plane device but needs to be updated, and the flow rule message further includes a time modification indicator, so that the forwarding plane device modifies, according to the time modification indicator, original aging time included in the flow entry.

According to a third aspect, a forwarding plane device is provided, including:

a receiving unit, configured to receive a flow rule message sent by a control plane device, where the flow rule message includes ineffective time of a flow entry and a time type identifier of the ineffective time; and a flow entry management unit, configured to: when the time type identifier indicates that the ineffective time is an ineffective moment of the flow entry, perform ineffectiveness processing on the flow entry according to the ineffective moment.

With reference to the third aspect, in a first possible implementation of the third aspect, the flow entry management unit is configured to: when a current moment of the forwarding plane device is the ineffective moment, perform ineffectiveness processing on the flow entry; or when enabling the flow entry, determine duration between a current moment and the ineffective moment as first ineffective duration of the flow entry, and when detecting that the first ineffective duration ends, perform ineffectiveness processing on the flow entry.

With reference to the third aspect or the first possible implementation of the third aspect, in a second possible implementation, the flow entry is a flow entry that is already installed on the forwarding plane device but needs to be updated, the flow rule message further includes a time modification indicator, and the flow entry management unit is further configured to:

modify, according to the time modification indicator, original aging time included in the flow entry to the ineffective moment; or modify, according to the time modification indicator, original aging time included in the flow entry to the first ineffective duration.

With reference to any one of the third aspect to the second possible implementation of the third aspect, in a third possible implementation, the flow rule message further includes effective time of the flow entry, the effective time is an effective moment of the flow entry or effective duration of the flow entry, the effective duration is duration that is between a first moment and the effective moment and that is calculated by the control plane device, and the first moment is a moment prior to the effective moment; and the flow entry management unit is further configured to: enable the flow entry when the effective moment of the flow entry arrives, or when it is detected that the effective duration ends.

With reference to any one of the third aspect to the third possible implementation of the third aspect, in a fourth possible implementation, the flow entry management unit is further configured to, if the time type identifier indicates that the ineffective time is second ineffective duration of the flow entry, perform ineffectiveness processing on the flow entry when detecting that the second ineffective duration ends, where the second ineffective duration is duration between the effective moment and the ineffective moment, or the second ineffective duration is duration between the first moment and the ineffective moment.

With reference to any one of the third aspect to the fourth possible implementation of the third aspect, in a fifth possible implementation, the flow entry is a flow entry that is already installed on the forwarding plane device but needs to be updated, the flow rule message further includes the time modification indicator, and the flow entry management unit is further configured to:

modify, according to the time modification indicator, original aging time included in the flow entry to the second ineffective duration.

With reference to any one of the third aspect to the fifth possible implementation of the third aspect, in a sixth possible implementation, the forwarding plane device further includes a verification unit, configured to: verify the ineffective time and/or the effective time; and when the verification fails, send a verification failure message to the control plane device.

According to a fourth aspect, a control plane device is provided, including:

a determining unit, configured to determine ineffective time of a flow entry; and a sending unit, configured to send a flow rule message to a forwarding plane device, where the flow rule message includes the ineffective time determined by the determining unit and a time type identifier of the ineffective time, and the time type identifier is used to indicate whether the ineffective time is an ineffective moment of the flow entry or ineffective duration of the flow entry.

With reference to the fourth aspect, in a first possible implementation of the fourth aspect, the flow rule message sent, by the sending unit to the forwarding plane device further includes effective time of the flow entry, the effective time is an effective moment of the flow entry or effective duration of the flow entry, the effective duration is duration that is between a first moment and the effective moment and that, is calculated by the control plane device, and the first moment is a moment prior to the effective moment, so that when the effective moment of the flow entry arrives, or when it is detected that the effective duration ends, the forwarding plane device enables the flow entry.

With reference to the fourth aspect or the first possible implementation of the fourth aspect, in a second possible implementation, the determining unit is specifically configured to:

determine the ineffective duration of the flow entry, where the ineffective duration is duration between the effective moment and the ineffective moment, or the ineffective duration is duration between the first moment and the ineffective moment, so that when the time type identifier indicates that the ineffective time is the ineffective duration, the forwarding plane device performs ineffectiveness processing on the flow entry when detecting that the ineffective duration ends.

With reference to any one of the fourth aspect to the second possible implementation of the fourth aspect, in a third possible implementation, the flow entry is a flow entry that is already installed on the forwarding plane device but needs to be updated, and the flow rule message sent by the sending unit to the forwarding plane device further includes a time modification indicator, so that the forwarding plane device modifies, according to the time modification indicator, original aging time included in the flow entry.

According to a fifth aspect, another forwarding plane device is provided, including a processor, a communications interface, a memory, and a communications bus, where the processor, the communications interface, and the memory perform mutual communication by using the communications bus;

the memory is configured to store program code; and the processor invokes the program code stored by the memory to:

receive a flow rule message sent by a control plane device, where the flow rule message includes ineffective time of a flow entry and a time type identifier of the ineffective time; and if the time type identifier indicates that the ineffective time is an ineffective moment of the flow entry, perform ineffectiveness processing on the flow entry according to the ineffective moment.

With reference to the fifth aspect, in a first possible implementation of the fifth aspect, the processor further invokes the program code stored by the memory to:

when a current moment of the forwarding plane device is the ineffective moment, perform ineffectiveness processing on the flow entry; or when the forwarding plane device enables the flow entry, determine duration between a current moment and the ineffective moment as first ineffective duration of the flow entry, and when it is detected that the first ineffective duration ends, perform ineffectiveness processing on the flow entry.

With reference to the fifth aspect or the first possible implementation of the fifth aspect, in a second possible implementation, the flow entry is a flow entry that is already installed on the forwarding plane device but needs to be updated, the flow rule message further includes a time modification indicator, and the processor further invokes the program code stored by the memory to:

modify, according to the time modification indicator, original aging time included in the flow entry to the ineffective moment; or modify, according to the time modification indicator, original aging time included in the flow entry to the first ineffective duration.

With reference to any one of the fifth aspect to the second possible implementation of the fifth aspect, in a third possible implementation, the flow rule message further includes effective time of the flow entry, the effective time is an effective moment of the flow entry or effective duration of the flow entry, the effective duration is duration that is between a first moment and the effective moment and that is calculated by the control plane device, and the first moment is a moment prior to the effective moment; and the processor further invokes the program code stored by the memory to:

enable the flow entry when the effective moment of the flow entry arrives, or when it is detected that the effective duration ends.

With reference to any one of the fifth aspect to the third possible implementation of the fifth aspect, in a fourth possible implementation, the processor further invokes the program code stored by the memory to: if the time type identifier indicates that the ineffective time is second ineffective duration of the flow entry, perform ineffectiveness processing on the flow entry when it is detected that the second ineffective duration ends, where the second ineffective duration is duration between the effective moment and the ineffective moment, or the second ineffective duration is duration between the first moment and the ineffective moment.

With reference to any one of the fifth aspect to the fourth possible implementation of the fifth aspect, in a fifth possible implementation, the flow entry is a flow entry that is already installed on the forwarding plane device but needs to be updated, the flow rule message further includes the time modification indicator, and the processor further invokes the program code stored by the memory to:

modify, according to the time modification indicator, original aging time included in the flow entry to the second ineffective duration.

With reference to any one of the fifth aspect to the fifth possible implementation of the fifth aspect, in a sixth possible implementation, after the forwarding plane device receives the flow rule message sent by the control plane device, the processor further invokes the program code stored by the memory to:

verify the ineffective time and/or the effective time; and
when the verification fails, send a verification failure
message to the control plane device.

According to a sixth aspect, another control plane device is provided, including a processor, a communications interface, a memory, and a communications bus, where the processor, the communications interface, and the memory perform mutual communication by using the communications bus;

the memory is configured to store program code; and the processor invokes the program code stored by the memory to:

determine ineffective time of a flow entry; and send a flow rule message to a forwarding plane device, where the flow rule message includes the ineffective time of the flow entry and a time type identifier of the ineffective time, and the time type identifier is used to indicate whether the ineffective time is an ineffective moment of the flow entry or ineffective duration of the flow entry.

With reference to the sixth aspect, in a first possible implementation of the sixth aspect, the flow rule message further includes effective time of the flow entry, the effective time is an effective moment of the flow entry or effective duration of the flow entry, the effective duration is duration that is between a first moment and the effective moment and that is calculated by the control plane device, and the first moment is a moment prior to the effective moment, so that when the effective moment of the flow entry arrives, or when it is detected that the effective duration ends, the forwarding plane device enables the flow entry.

With reference to the sixth aspect or the first possible implementation of the sixth aspect, in a second possible implementation, the processor further invokes the program code stored by the memory to:

determine the ineffective duration of the flow entry, where the ineffective duration is duration between the effective moment and the ineffective moment, or the ineffective duration is duration between the first moment and the ineffective moment, so that when the time type identifier indicates that the ineffective time is the ineffective duration, the forwarding plane device performs ineffectiveness processing on the flow entry when detecting that the ineffective duration ends.

With reference to any one of the sixth aspect to the second possible implementation of the sixth aspect, in a third possible implementation, the flow entry is a flow entry that is already installed on the forwarding plane device but needs to be updated, and the flow rule message further includes a time modification indicator, so that the forwarding plane device modifies, according to the time modification indicator, original aging time included in the flow entry.

According to the foregoing solutions, the forwarding plane device receives the flow rule message sent by the control plane device, where the flow rule message includes the ineffective time of the flow entry and the time type identifier of the ineffective time; and when the time type identifier indicates that the ineffective time is the ineffective moment of the flow entry, performs ineffectiveness processing on the flow entry according to the ineffective moment. In this way, when obtaining the ineffective moment of the flow entry, the forwarding plane device may directly perform ineffectiveness processing on the flow entry when the ineffective moment arrives. Alternatively, the forwarding plane device may determine the duration between the current moment at which the flow entry is enabled and the ineffective moment as the ineffective duration of the flow entry, and perform ineffectiveness processing on the flow entry when detecting that the ineffective duration ends. This ensures absolute accuracy of an actual ineffective moment of the flow entry.

BRIEF DESCRIPTION OF DRAWINGS

To describe the technical solutions in the embodiments of the present disclosure more clearly, the following briefly describes the accompanying drawings required for describing the embodiments. Apparently, the accompanying drawings in the following description show merely some embodiments of the present disclosure, and a person of ordinary skill in the art may still derive other drawings from these accompanying drawings without creative efforts.

FIG. 1 is a schematic structural diagram of a flow entry according to the present disclosure;

FIG. 2 is a schematic flowchart of a flow entry timing processing method according to an embodiment of the present disclosure;

FIG. 3 is a schematic flowchart of another flow entry timing processing method according to an embodiment of the present disclosure;

DESCRIPTION OF EMBODIMENTS

Figure 4:
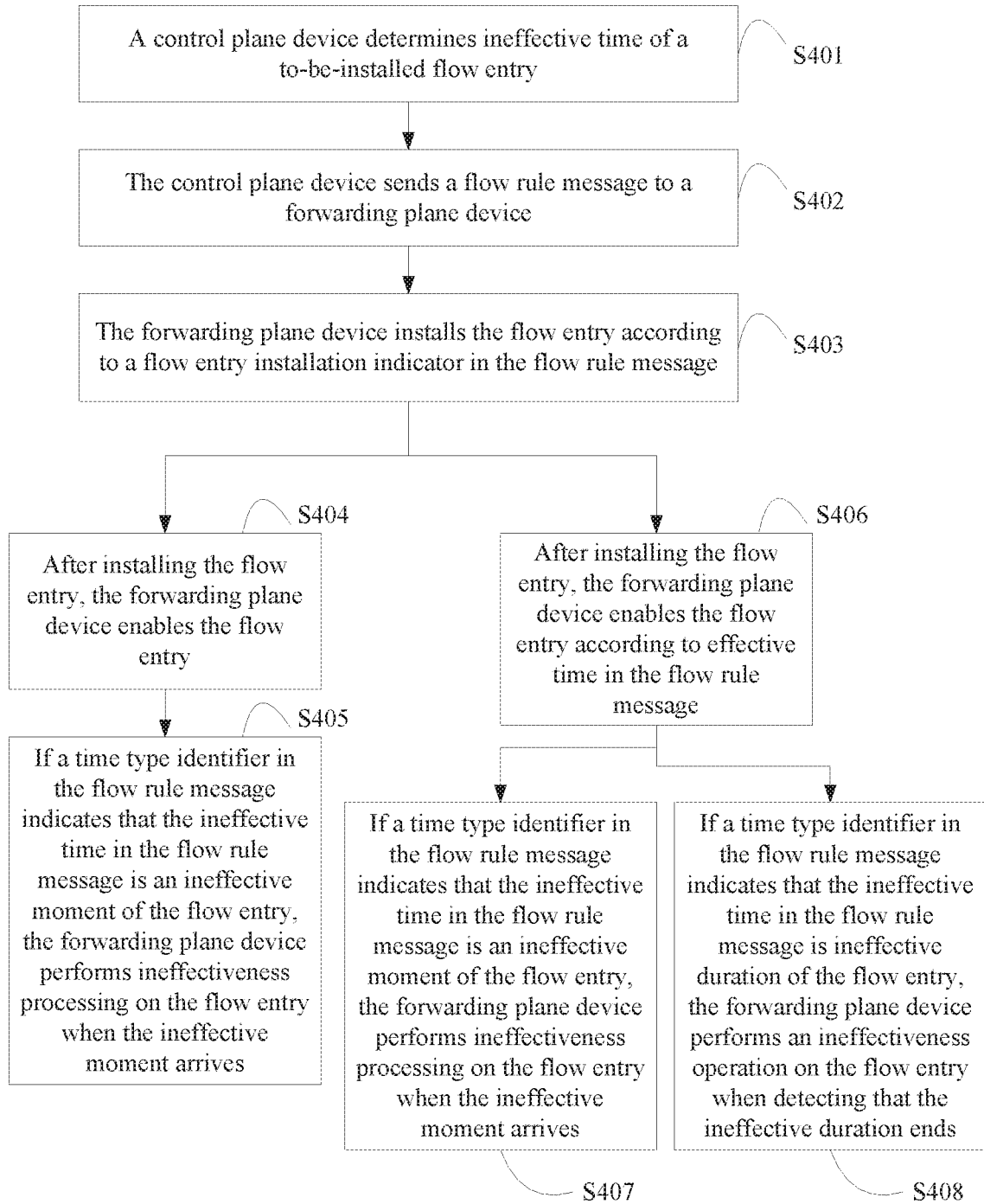
FIG. 4 is a schematic flowchart of still another flow entry timing processing method according to an embodiment of the present disclosure.

To help a person skilled in the art understand the solutions, the following first describes a flow entry. FIG. 1 is a schematic structural diagram of a flow entry. The flow entry includes a header field, a counter field, an operation field, and a time field. The header field is used to match header content of a data packet received by a forwarding plane device. The counter field is used to count statistical data of flow entries. The operation field indicates an operation to be performed for a data packet that matches the flow entry. The time field records aging time of the flow entry. In the prior art, the aging time is generally duration between an ineffective moment of the flow entry and an effective moment, predicted by a control plane device, of the flow entry. However, because the control plane device cannot accurately predict the effective moment of the flow entry, an actual ineffective moment of the flow entry is not accurate.

To make the purpose, technical solutions, and advantages of the embodiments of the present disclosure clearer, the following clearly describes the technical solutions of the embodiments of the present disclosure with reference to the accompanying drawings in the embodiments of the present disclosure. Apparently, the described embodiments are some rather than all of the embodiments of the present disclosure. All other embodiments obtained by a person of ordinary skill in the art based on the embodiments of the present disclosure without creative efforts shall fall within the protection scope of the present disclosure.

Embodiment 1

An embodiment of the present disclosure first provides a flow entry timing processing method. As shown in FIG. 2, the method includes the following steps.

S201. A forwarding plane device receives a flow rule message sent by a control plane device, where the flow rule message includes ineffective time of a flow entry and a time type identifier of the ineffective time.

S202. If the time type identifier indicates that the ineffective time is an ineffective moment of the flow entry, the forwarding plane device performs ineffectiveness processing on the flow entry according to the ineffective moment.

It should be noted that the existing OpenFlow protocol defines aging time of a duration type, but in this embodiment of the present disclosure, in addition to sending ineffective duration of a duration type, the control plane device may also send the ineffective moment of the flow entry to the forwarding plane device. Therefore, to indicate whether the ineffective time is the ineffective duration or the ineffective moment of the flow entry, the time type identifier is added to the flow rule message in this embodiment of the present disclosure.

According to the flow entry timing processing method provided in this embodiment of the present disclosure, when obtaining the ineffective moment of the flow entry, the forwarding plane device may directly perform ineffectiveness processing on the flow entry when the ineffective moment arrives. Alternatively, the forwarding plane device may determine duration between a current moment at which the flow entry is enabled and the ineffective moment as the ineffective duration of the flow entry, and perform ineffectiveness processing on the flow entry when detecting that the ineffective duration ends. This ensures absolute accuracy of an actual ineffective moment of the flow entry.

It should be noted that step S201 to step S202 are applicable to a flow entry installation scenario and a flow entry update scenario.

Specifically, in the flow entry installation scenario, the flow rule message further includes a flow entry installation indicator and other composition parts of the flow entry. For the other composition parts, reference may be made to FIG. 1, and details are not repeated herein. In this case, before step S202, the forwarding plane device may also install the flow entry according to the flow entry installation indicator, and enable the flow entry after the flow entry is successfully installed.

In the flow entry update scenario, the flow rule message further includes a flow entry identifier and a time modification indicator. After step S201, the forwarding plane device may further determine a to-be-updated flow entry of the forwarding plane device according to the flow entry identifier. If the time type identifier indicates that the ineffective time is the ineffective moment of the flow entry, the forwarding plane device may further modify, according to the time modification indicator, original aging time included in the flow entry to the ineffective moment. Alternatively, the forwarding plane device may further determine the duration between the current moment at which the flow entry is enabled and the ineffective moment as first ineffective duration of the flow entry, and modify, according to the time modification indicator, original aging time included in the flow entry to the first ineffective duration.

In one possible implementation of this embodiment of the present disclosure, the flow rule message may further include effective time. The effective time is an effective moment of the flow entry or effective duration of the flow entry. The effective duration is duration that is between a first moment and the effective moment and that is calculated by the control plane device, and the first moment is a moment prior to the effective moment. Before performing ineffectiveness processing on the flow entry, the forwarding plane device may also enable the flow entry when the effective moment of the flow entry arrives or when it is detected that the effective duration ends.

According to the implementation, the control plane device informs the forwarding plane device of the time when the flow entry is to be enabled, that is, the control plane device can accurately know the effective moment of the flow entry and does not need to make a prediction. Therefore, the control plane device may determine second ineffective duration between the effective moment and the ineffective moment of the flow entry as the Ineffective time included in the flow rule message. In this way, if the time type identifier indicates that the ineffective time is the second ineffective duration, after installing the flow entry or updating the flow entry, the forwarding plane device may enable the flow entry when the effective moment included in the flow rule message arrives; and perform ineffectiveness processing on the flow entry when detecting that the second ineffective duration ends. This ensures absolute accuracy of the actual ineffective moment of the flow entry.

In addition, the second ineffective duration may alternatively be duration between the first moment and the ineffective moment of the flow entry, and the first moment may be a current moment at which the control plane device determines the effective duration. In this way, if the time type identifier indicates that the ineffective time is the second ineffective duration, after installing the flow entry or updating the flow entry, the forwarding plane device may simultaneously start timing for the effective duration and the second ineffective duration. When detecting that the effective duration ends, the forwarding plane device enables the flow entry. When detecting that the second ineffective duration ends, the forwarding plane device performs ineffectiveness processing on the flow entry. The effective duration and the second ineffective duration are duration calculated based on a same moment by the control plane device, and the forwarding plane device simultaneously starts timing for the effective duration and the second ineffective duration. Therefore, absolute accuracy of running duration of the flow entry is ensured.

Embodiment 2

An embodiment of the present disclosure provides another flow entry timing processing method. As shown in FIG. 3, the method includes the following steps.

S301. A control plane device determines ineffective time of a flow entry.

S302, The control plane device sends a flow rule message to a forwarding plane device, where the flow rule message includes the ineffective time of the flow entry and a time type identifier of the ineffective time, and the time type identifier is used to indicate whether the ineffective time is an ineffective moment of the flow entry or ineffective duration of the flow entry.

Specifically, if the time type identifier indicates that the ineffective time is the ineffective moment of the flow entry, when obtaining the ineffective moment of the flow entry, the forwarding plane device may directly perform ineffectiveness processing on the flow entry when the ineffective moment arrives. Alternatively, the forwarding plane device may determine duration between a current moment at which the flow entry is enabled and the ineffective moment as the ineffective duration of the flow entry, and perform, ineffectiveness processing on the flow entry when detecting that the ineffective duration ends. This ensures absolute accuracy of an actual ineffective moment of the flow entry.

It should be noted that step S301 to step S302 are applicable to a flow entry installation scenario and a flow entry update scenario.

Specifically, in the flow entry installation scenario, the flow rule message further includes a flow entry installation indicator and other composition parts of the flow entry. For the other composition parts, reference may be made to FIG. 1, and details are not repeated herein. In this case, after receiving the flow rule message, the forwarding plane device may also install the flow entry according to the flow entry installation indicator, and enable the flow entry after the flow entry is successfully installed.

In the flow entry update scenario, the flow rule message further includes a flow entry identifier and a time modification indicator. After receiving the flow rule message, the forwarding plane device may further determine, according to the flow entry identifier, a to-be-updated flow entry of the forwarding plane device. If the time type identifier indicates that the ineffective time is the ineffective moment of the flow entry, the forwarding plane device may further modify, according to the time modification indicator, original aging time included in the flow entry to the ineffective moment. Alternatively, the forwarding plane device may further determine the duration between the current moment at which the flow entry is enabled and the ineffective moment as first ineffective duration of the flow entry, and modify, according to the time modification indicator, original aging time included in the flow entry to the first ineffective duration.

In one possible implementation of this embodiment of the present disclosure, the flow rule message further includes effective time of the flow entry. The effective time is an effective moment of the flow entry or effective duration of the flow entry, the effective duration is duration that is between a first moment and the effective moment and that is calculated by the control plane device, and the first moment is a moment prior to the effective moment, so that when the effective moment of the flow entry arrives, or when it is detected that the effective duration ends, the forwarding plane device enables the flow entry.

According to the implementation, the control plane device informs the forwarding plane device of the time when the flow entry is to be enabled, that is, the control plane device can accurately know the effective moment of the flow entry and does not need to make a prediction. Therefore, the determining, by a control plane device, ineffective time of a flow entry may specifically include: determining duration, that is, second ineffective duration, between the effective moment and the ineffective moment of the flow entry. That is, the ineffective time included in the flow entry is the second ineffective duration of the flow entry. In this way, if the time type identifier indicates that the ineffective time is the second ineffective duration, after installing the flow entry or updating the flow entry, the forwarding plane device may enable the flow entry when the effective moment included in the flow rule message arrives; and perform ineffectiveness processing on the flow entry when detecting that the second ineffective duration ends. This ensures absolute accuracy of the actual ineffective moment of the flow entry.

In addition, the second ineffective duration may alternatively be duration between the first moment and the ineffective moment of the flow entry, and the first moment may be a current moment at which the control plane device determines the effective duration. In this way, if the time type identifier indicates that the ineffective time is the second ineffective duration, after installing the flow entry or updating the flow entry, the forwarding plane device may simultaneously start, timing for the effective duration and the second ineffective duration. When detecting that the effective duration ends, the forwarding plane device enables the flow entry. When detecting that the second ineffective duration ends, the forwarding plane device performs ineffectiveness processing on the flow entry. The effective duration and the second ineffective duration are duration calculated based on a same moment by the control plane device, and the forwarding plane device simultaneously starts timing for the effective duration and the second ineffective duration. Therefore, absolute accuracy of running duration of the flow entry is ensured.

Embodiment 3

For a person skilled in the art to understand the technical solutions provided in the embodiments of the present disclosure more clearly, another flow entry timing processing method provided in an embodiment of the present disclosure is described below in a specific embodiment. The method is specifically used for flow entry installation. As shown in FIG. 4, the method includes the following steps.

S401. A control plane device determines ineffective time of a to-be-installed flow entry.

First, it should be noted that the control plane device may obtain, according to a type of a current service or other service related information, an ineffective moment and/or an effective moment of a flow rule used to forward data of the service. For example, for a time-limited video service that is provided between 8:00 and 16:00, the control plane device may determine that an effective moment of a flow rule used to forward data of the video service is 8:00, and an ineffective moment is 16:00. In this case, the control plane device may use an ineffective moment of the flow entry as the ineffective time, may use duration between an effective moment and an ineffective moment of the flow entry as the ineffective time, or may use duration between a current moment and an ineffective moment as the ineffective time, and use duration between the current moment and the effective moment as effective duration of the flow entry.

S402. The control plane device sends a flow rule message to a forwarding plane device.

The flow rule message includes a flow entry installation indicator, the to-be-installed flow entry, and a time type identifier, included in the flow entry, of the ineffective time.

It should be noted that the existing OpenFlow protocol defines aging time of a duration type, but in this embodiment of the present disclosure, in addition to sending ineffective duration of a duration type, the control plane device may also send the ineffective moment of the flow entry to the forwarding plane device. Therefore, to indicate whether the ineffective time is the ineffective duration or the ineffective moment of the flow entry, the time type identifier is added to the flow rule message in this embodiment of the present disclosure.

For example, an implementation of adding the time type identifier to the flow rule message is as follows:

```
enum ofp_flow_mod_time_type {
    OFPFT_ABSOLUTE_TIME = 1, /* ineffective moment */
    OFPFT_RELATIVE_TIME = 2, /* ineffective duration */
};
``` enum indicates that ofp_flow_mod_time_type is defined as data of an enumeration type, that is, ofp_flow_mod_time_type can only be OFPFT_ABSOLUTE_TIME or OFPFT_RELATIVE_TIME. In this case, if a value of ofp_flow_mod_time_type in the flow rule message is OFPFT_ABSOLUTE_TIME, it indicates that the ineffective time is the ineffective moment of the flow entry. If a value of ofp_flow_mod_time_type in the flow rule message is OFPFT_RELATIVE_TIME, it indicates that the ineffective time is the ineffective duration of the flow entry.

S403. The forwarding plane device installs the flow entry according to a flow entry installation indicator in the flow rule message.

Specifically, if the flow rule message does not include effective time of the flow entry, step S404 to step S405 are performed. If the flow rule message includes the effective time of the flow entry, step S406 is performed.

S404. After installing the flow entry, the forwarding plane device enables the flow entry.

S405. If a time type identifier in the flow rule message indicates that the ineffective time in the flow rule message is an ineffective moment of the flow entry, the forwarding plane device performs ineffectiveness processing on the flow entry when the ineffective moment arrives.

In one possible implementation of this embodiment of the present disclosure, the forwarding plane device may alternatively determine duration between a current moment at which the flow entry is enabled and the ineffective moment as the ineffective duration of the flow entry, and when detecting that the ineffective duration ends, perform ineffectiveness processing on the flow entry.

S406. After installing the flow entry, the forwarding plane device enables the flow entry according to effective time in the flow rule message.

In a specific implementation process, a new variable Validate_time may be defined in the flow rule message Flow_mod, to indicate the effective time of the flow entry.

Specifically, the effective time may be the effective moment of the flow entry or the effective duration of the flow entry. The flow rule message may further include a time type identifier of the effective time, to indicate a time type of the effective time. For an implementation of the time type identifier of the effective time, reference may be made to the description of the time type identifier of the ineffective time in step S402, and details are not repeated herein.

For example, if the effective time is the effective moment of the flow entry, after installing the flow entry, the forwarding plane device does not immediately use the flow entry to perform data matching and forwarding, but enables the flow entry at the effective moment. This implements accurate control of enabling time of the flow entry.

If the effective time is the effective duration of the flow entry, after installing the flow entry, the forwarding plane device starts timing for the effective duration. For example, the forwarding plane device sets and starts a timer according to the effective duration, and enables the flow entry at a moment at which timeout of the timer is detected.

S407. If a time type identifier in the flow rule message indicates that the ineffective time in the flow rule message is an ineffective moment of the flow entry, the forwarding plane device performs ineffectiveness processing on the flow entry when the ineffective moment arrives.

In one possible implementation of this embodiment of the present disclosure, the forwarding plane device may alternatively determine the duration between the effective moment of the flow entry and the ineffective moment as the ineffective duration of the flow entry, and perform ineffectiveness processing on the flow entry when detecting that the ineffective duration ends.

In addition, when the flow rule message includes the effective duration of the flow entry, the forwarding plane device may also perform step S408.

S408. If the time type identifier in the flow rule message indicates that the ineffective time in the flow rule message is ineffective duration of the flow entry, the forwarding plane device performs an ineffectiveness operation on the flow entry when detecting that the ineffective duration ends.

Specifically, in step S406, if the effective time is the effective moment of the flow entry, the ineffective duration may be duration that is between the effective moment and the ineffective moment of the flow entry and that is calculated by the control plane device. In this way, when the effective moment arrives, the forwarding plane device may enable the flow entry, and start timing for the ineffective duration. When detecting that the ineffective duration ends, the forwarding plane device performs ineffectiveness processing on the flow entry.

In step S406, if the effective time is the effective duration of the flow entry, the effective duration is duration that is between a first moment and the effective moment and that is calculated by the control plane device, and the first moment is a moment prior to the effective moment, the ineffective duration may also be duration between the first moment and the ineffective moment of the flow entry. The first moment may be a current moment at which the control plane device determines the effective duration. In this case, in step S406 and step S408, the forwarding plane device needs to simultaneously start and monitor timing for the effective duration and the ineffective duration. When detecting that the effective duration ends, the forwarding plane device enables the flow entry. When detecting that the ineffective duration ends, the forwarding plane device performs ineffectiveness processing on the flow entry. This ensures absolute accuracy of running duration of the flow entry.

In one possible implementation of this embodiment of the present disclosure, to improve reliability of the flow entry timing processing method, after receiving the flow rule message sent by the control plane device, the forwarding plane device may further verify the ineffective time and/or the effective time included in the flow rule message, and when the verification fails, send a verification failure message to the control plane device.

For example, the effective moment and the ineffective moment of the flow entry cannot be earlier than the current moment of the forwarding plane device, and the effective moment cannot be later than the ineffective moment. Therefore, after the forwarding plane device obtains the effective moment and the ineffective moment of the flow entry, the verifying the effective moment and the ineffective moment may specifically include: determining a chronological order of the effective moment and the ineffective moment, a chronological order of the effective moment and the current moment of the forwarding plane device, and a chronological order of the ineffective moment and the current moment of the forwarding plane device. If the effective moment is later than the ineffective moment, or either the effective moment or the ineffective moment is earlier than the current moment of the forwarding plane device, the forwarding plane device sends the verification failure message to the control plane device. The verification failure message may include a failure type, so that the control plane device adjusts the effective moment and/or the ineffective moment according to the failure type.

The foregoing is merely an example for description. In the present disclosure, another verification may also be performed on the effective time and the ineffective time of the flow entry, for example, verifying whether the effective time is of a time type supported by the forwarding plane device. This is not limited in the present disclosure.

It should be noted that the steps in FIG. 4 are merely examples for description. For simplicity of description, the steps are described as a combination of a series of actions. However, a person skilled in the art may know that the present disclosure is not limited to the described action order, and may also know that the embodiments described in the specifications are all preferred embodiments, and the actions are unnecessarily mandatory for the embodiments of the present disclosure.

Embodiment 4

Figure 5:
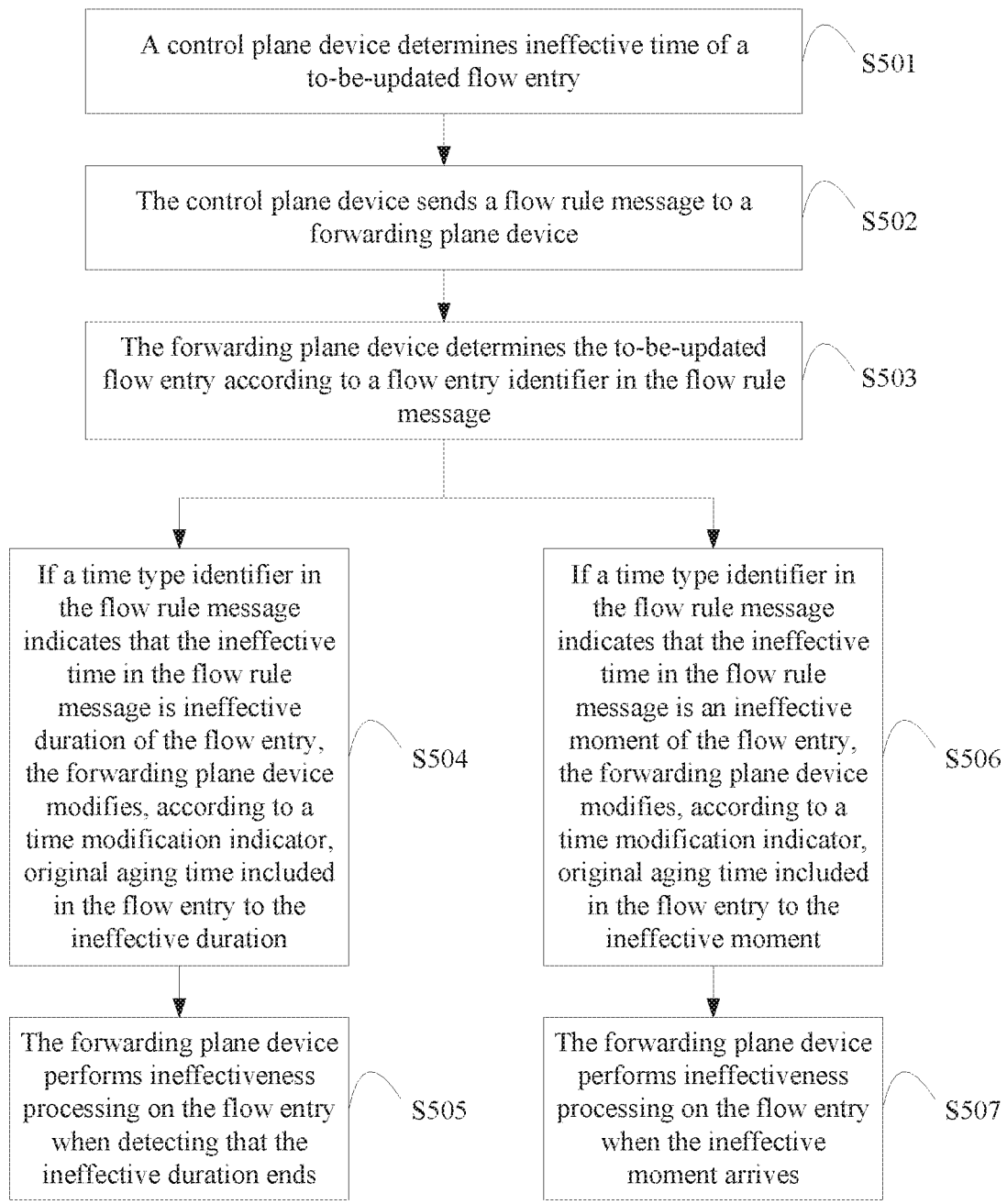
FIG. 5 is a schematic flowchart of still another flow entry timing processing method according to an embodiment of the present disclosure.
Figure 6:
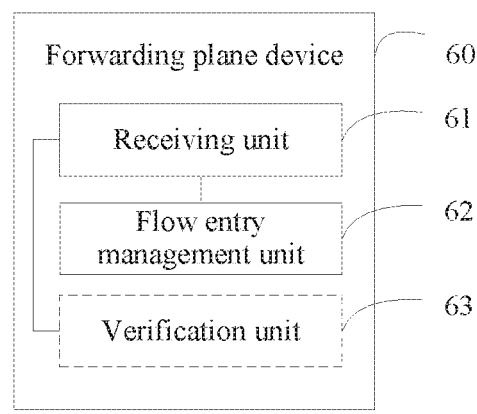
FIG. 6 is a schematic structural diagram of a forwarding plane device according to an embodiment of the present disclosure.

For a person skilled in the art to understand the technical solutions provided in the embodiments of the present disclosure more clearly, another flow entry timing processing method provided in an embodiment of the present disclosure is described below in a specific embodiment. The method is specifically used for flow entry update. As shown in FIG. 5, the method includes the following steps.

S501. A control plane device determines ineffective time of a to-be-updated flow entry.

Specifically, the control plane device may use an ineffective moment of the flow entry as the ineffective time, or duration between an effective moment of the flow entry and an ineffective moment as the ineffective time, or may predict an effective moment of the flow entry, and use duration between the effective moment and an ineffective moment as the ineffective time.

S502. The control plane device sends a flow rule message to a forwarding plane device.

The flow rule message includes a time modification indicator, a flow entry identifier, the ineffective time, and a time type identifier of the ineffective time.

Specifically, according to the existing OpenFlow protocol, aging time of a flow entry can only be updated by deleting the flow entry and installing a new flow entry. In this embodiment of the present disclosure, the time modification indicator is added to the flow rule message, to instruct the forwarding plane device to directly modify original aging time included in the installed flow entry.

For example, an implementation of adding the time modification indicator to the flow rule message is as follows:

```
enum ofp_flow_mod_flags {
  OFPFF_SEND_FLOW_REM = 1 << 0, /*When a flow rule expires, delete the flow rule*/
  OFPFF_CHECK_OVERLAP = 1 << 1, /*Check for a duplicate flow rule*/
  OFPFF_RESET_COUNTS = 1 << 2, /*Reset a counter of the flow rule*/
  OFPFF_NO_PKT_COUNTS = 1 << 3, /*Do not count a data packet*/
  OFPFF_NO_BYT_COUNTS = 1 << 4, /*Do not count a byte*/
  OFPFF_MODIFY_TIMEOUT = 1 << 5, /*Modify aging time*/
};
```

It can be learned from the above that OFPFF_MODIFY_TIMEOUT of an enumeration type is added to an existing ofp_flow_mod_flags in this embodiment of the present disclosure. That is, if a value of ofp_flow_mod_flags in the flow rule message is OFPFF_MODIFY_TIMEOUT, the forwarding plane device is instructed to modify the aging time of the flow entry.

S503. The forwarding plane device determines the to-be-updated flow entry according to a flow entry identifier in the flow rule message.

The flow entry may be a flow entry that is already installed on the forwarding plane device but needs to be updated.

S504. If a time type identifier in the flow rule message indicates that the ineffective time in the flow rule message is ineffective duration of the flow entry, the forwarding plane device modifies, according to a time modification indicator, original aging time included in the flow entry to the ineffective duration.

It should be noted that the ineffective duration may be duration between the ineffective moment of the flow entry and the effective moment, predicted by the control plane device, of the flow entry. However, in the prior art, a control plane device needs to use multiple pieces of signaling to implement flow entry aging time update. In comparison, in this embodiment of the present disclosure, flow entry aging time update can be implemented by using only one piece of signaling. Therefore, the control plane device can more accurately predict the effective moment of the flow entry, so that accuracy of an actual ineffective moment of the flow entry is improved.

S505. The forwarding plane device performs ineffectiveness processing on the flow entry when detecting that the ineffective duration ends.

S506. If a time type identifier in the flow rule message indicates that the ineffective time in the flow rule message is an ineffective moment of the flow entry, the forwarding plane device modifies, according to a time modification indicator, original aging time included in the flow entry to the ineffective moment.

S507. The forwarding plane device performs ineffectiveness processing on the flow entry when the ineffective moment arrives.

In step S507, the forwarding plane device directly performs ineffectiveness processing on the flow entry at the ineffective moment, so that an actual ineffective moment of the flow entry is the ineffective moment sent by the control plane device to the forwarding plane device. This ensures absolute accuracy of the actual ineffective moment of the flow entry.

In a first possible implementation of this embodiment of the present disclosure, the forwarding plane device may alternatively determine the duration between the effective moment of the flow entry and the ineffective moment as the ineffective duration of the flow entry, modify, according to the time modification indicator, the original aging time included in the flow entry to the ineffective duration, and perform ineffectiveness processing on the flow entry when detecting that the ineffective duration ends.

In addition, in this embodiment of the present disclosure, the flow entry may further include effective time of the flow entry, and the effective time may be the effective moment of the flow entry, or may be effective duration of the flow entry. The effective duration is duration that is between a first moment and the effective moment and that is calculated by the control plane device, and the first moment is a moment prior to the effective moment. In this way, after modifying, according to the time modification indicator, the original aging time included in the flow entry, the electronic device may also enable the flow entry at the effective moment of the flow entry, or enable the flow entry when detecting that the effective duration of the flow entry ends. For details, reference may be made to the description of the effective time in Embodiment 3, and details are not repeated herein.

In addition, in one possible implementation of this embodiment of the present disclosure, to improve reliability of the flow entry timing processing method, after receiving the flow rule message sent by the control plane device, the forwarding plane device may further verify the ineffective time and/or the effective time included in the flow rule message, and when the verification fails, send a verification failure message to the control plane device. For details, reference may be made to the example description of verifying the effective time and the ineffective time by the forwarding plane device in Embodiment 4, and details are not repeated herein.

It should be rioted that the steps in FIG. 5 are merely examples for description. For simplicity of description, the steps are described as a combination of a series of actions. However, a person skilled in the art may know that the present disclosure is not limited to the described action order, and may also know that the embodiments described in the specifications are all preferred embodiments, and the actions are unnecessarily mandatory for the embodiments of the present disclosure.

Embodiment 5

An embodiment of the present disclosure provides a forwarding plane device 60, configured to implement the flow entry timing processing method provided in Embodiment 1 of the present disclosure. As shown in FIG. to, the forwarding plane device 60 includes:

a receiving unit 61, configured to receive a flow rule message sent by a control plane device, where the flow rule message includes ineffective time of a flow entry and a time type identifier of the ineffective time; and a flow entry management unit 62, configured to: when the time type identifier indicates that the ineffective time is an ineffective moment of the flow entry, perform ineffectiveness processing on the flow entry according to the ineffective moment.

Optionally, the flow entry management unit 62 is specifically configured to: when a current moment of the forwarding plane device is the ineffective moment, perform ineffectiveness processing on the flow entry; or when enabling the flow entry, determine duration between a current moment and the ineffective moment as first ineffective duration of the flow entry, and when detecting that the first ineffective duration ends, perform ineffectiveness processing on the flow entry.

In this way, an end moment of the first ineffective duration is the ineffective moment, that is, an actual ineffective moment of the flow entry is the ineffective moment sent by the control plane device to the forwarding plane device. This ensures absolute accuracy of the actual ineffective moment of the flow entry.

Optionally, the flow entry is a flow entry that is already installed on the forwarding plane device but needs to be updated, the flow rule message further includes a time modification indicator, and the flow entry management unit 62 is further configured to:

modify, according to the time modification indicator, original aging time included in the flow entry to the ineffective moment; or modify, according to the time modification indicator, original aging time included in the flow entry to the first ineffective duration.

For example, in a flow entry update scenario, the flow rule message further includes a flow entry identifier and the time modification indicator. The forwarding plane device may also determine, according to the flow entry identifier, a to-be-updated flow entry of the forwarding plane device. If the time type identifier indicates that the ineffective time is the ineffective moment of the flow entry, the forwarding plane device may further modify the original aging time of the flow entry according to the time modification indicator.

Optionally, the flow rule message further includes effective time of the flow entry. The effective time is an effective moment of the flow entry or effective duration of the flow entry. The effective duration is duration that is between a first moment and the effective moment and that is calculated by the control plane device, and the first moment is a moment prior to the effective moment. The flow entry management unit 62 is further configured to:

enable the flow entry when the effective moment of the flow entry arrives, or when it is detected that the effective duration ends.

Optionally, the flow entry management unit 62 is further configured to, if the time type identifier indicates that the ineffective time is second ineffective duration of the flow entry, perform ineffectiveness processing on the flow entry when detecting that the second ineffective duration ends.

The second ineffective duration is duration between the effective moment and the ineffective moment, or the second ineffective duration is duration between the first moment and the ineffective moment.

Specifically, if the second ineffective duration is the duration between the effective moment and the ineffective moment, the forwarding plane device enables the flow entry at the effective moment, and starts and monitors timing for the second ineffective duration. When detecting that the second ineffective duration ends, the forwarding plane device performs ineffectiveness processing on the flow entry. This ensures absolute accuracy of the actual ineffective moment of the flow entry. If the second ineffective duration is the duration between the first moment and the ineffective moment, the forwarding plane device starts and monitors timing simultaneously for the effective duration in the flow rule message and the second ineffective duration. When detecting that the effective duration ends, the forwarding plane device enables the flow entry. When detecting that the second ineffective duration ends, the forwarding plane device performs ineffectiveness processing on the flow entry. This ensures absolute accuracy of running duration of the flow entry.

Optionally, the flow entry is a flow entry that is already installed on the forwarding plane device but needs to be updated, the flow rule message further includes a time modification indicator, and the flow entry management unit 62 is further configured to:

modify, according to the time modification indicator, original aging time included in the flow entry to the second ineffective duration.

It should be noted that the ineffective time in the flow rule message may alternatively be duration between the ineffective moment of the flow entry and an effective moment, predicted by the control plane device, of the flow entry. However, in the prior art, a control plane device needs to use multiple pieces of signaling to implement flow entry aging time update. In comparison, in this embodiment of the present disclosure, flow entry aging time update can be implemented by using only one piece of signaling. Therefore, the control plane device can more accurately predict the effective moment of the flow entry, so that accuracy of the actual ineffective moment of the flow entry is improved.

Optionally, the forwarding plane device further includes a verification unit 63, configured to: verify the ineffective time and/or the effective time; and when the verification fails, send a verification failure message to the control plane device.

For example, the effective moment and the ineffective moment of the flow entry cannot be earlier than the current moment of the forwarding plane device, and the effective moment cannot be later than the ineffective moment. Therefore, after the forwarding plane device obtains the effective moment and the ineffective moment of the flow entry, the verifying the effective moment and the ineffective moment may specifically include: determining a chronological order of the effective moment and the ineffective moment, a chronological order of the effective moment and the current moment of the forwarding plane device, and a chronological order of the ineffective moment and the current moment of the forwarding plane device. If the effective moment is later than the ineffective moment, or either the effective moment or the ineffective moment is earlier than the current moment of the forwarding plane device, the forwarding plane device sends the verification failure message to the control plane device. The verification failure message may include a failure type, so that the control plane device adjusts the effective moment and/or the ineffective moment according to the failure type.

The foregoing is merely an example for description. In the present disclosure, another verification may also be performed on the effective time and the ineffective time of the flow entry, for example, verifying whether the effective time is of a time type supported by the forwarding plane device. This is not limited in the present disclosure.

It can be clearly understood by a person skilled in the art that, for ease and brevity of description, a specific working process and description of the forwarding plane device is not repeated herein, and reference may be made to the corresponding process of the method embodiment.

Embodiment 6

Figure 7:
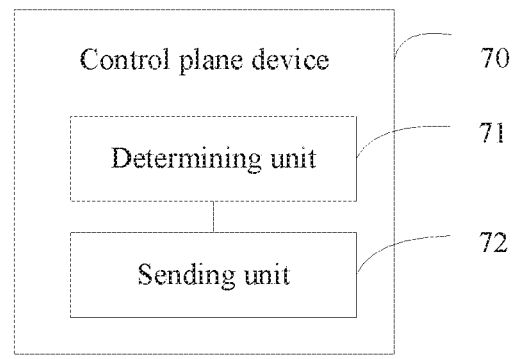
FIG. 7 is a schematic structural diagram of a control plane device according to an embodiment of the present disclosure.

An embodiment of the present disclosure provides a control plane device 70, configured to implement the flow entry timing processing method provided in Embodiment 2 of the present disclosure. As shown in FIG. 7, the control plane device 70 includes:

a determining unit 71, configured to determine ineffective time of a flow entry; and a sending unit 72, configured to send a flow rule message to a forwarding plane device, where the flow rule message includes the ineffective time determined by the determining unit and a time type identifier of the ineffective time, and the time type identifier is used to indicate whether the ineffective time is an ineffective moment of the flow entry or ineffective duration of the flow entry.

In this way, if the time type identifier indicates that the ineffective time is the ineffective moment of the flow entry, when obtaining the ineffective moment of the flow entry, the forwarding plane device may directly perform ineffectiveness processing on the flow entry when the ineffective moment arrives. Alternatively, the forwarding plane device may determine duration between a current moment at which the flow entry is enabled and the ineffective moment as the ineffective duration of the flow entry, and perform ineffectiveness processing on the flow entry when detecting that the ineffective duration ends. This ensures absolute accuracy of an actual ineffective moment of the flow entry.

Optionally, the flow rule message sent by the sending unit 72 to the forwarding plane device further includes effective time of the flow entry. The effective time is an effective moment of the flow entry or effective duration of the flow entry, the effective duration is duration that is between a first moment and the effective moment and that is calculated by the control plane device, and the first moment is a moment prior to the effective moment, so that when the effective moment of the flow entry arrives, or when it is detected that the effective duration ends, the forwarding plane device enables the flow entry.

Optionally, the determining unit 71 is specifically configured to:

determine the ineffective duration of the flow entry, where the ineffective duration is duration between the effective moment and the ineffective moment, or the ineffective duration is duration between the first moment and the ineffective moment, so that when the time type identifier indicates that the ineffective time is the ineffective duration, the forwarding plane device performs ineffectiveness processing on the flow entry when detecting that the ineffective duration ends.

In one possible implementation of this embodiment of the present disclosure, the flow rule message includes the effective moment and the ineffective duration of the flow entry. The ineffective duration is duration that is between the effective moment and the ineffective moment of the flow entry and that is calculated by the control plane device. In this way, the forwarding plane device may enable the flow entry when the effective moment arrives, and starts timing for the ineffective duration. When detecting that the ineffective duration ends, the forwarding plane device performs ineffectiveness processing on the flow entry. This ensures absolute accuracy of an actual ineffective moment of the flow entry.

In another possible implementation of this embodiment of the present disclosure, the flow rule message includes the effective duration and the ineffective duration of the flow entry. The ineffective duration is duration that is between the first moment and the ineffective moment of the flow entry and that is calculated by the control plane device. The first moment may be a current moment at which the control plane device determines the effective duration. In this way, after receiving the flow rule message, the forwarding plane device starts and monitors timing simultaneously for the effective duration and the ineffective duration. When detecting that the effective duration ends, the forwarding plane device enables the flow entry. When detecting that the ineffective duration ends, the forwarding plane device performs ineffectiveness processing on the flow entry. This ensures absolute accuracy of running duration of the flow entry.

Optionally, the flow entry is a flow entry that is already installed on the forwarding plane device but needs to be updated, the flow rule message sent by the sending unit to the forwarding plane device further includes a time modification indicator, so that the forwarding plane device modifies, according to the time modification indicator, original aging time included in the flow entry.

Specifically, according to the existing OpenFlow protocol, aging time of a flow entry can only be updated by deleting the flow entry and installing a new flow entry. In this embodiment of the present disclosure, the time modification indicator is added to the flow rule message, to instruct the forwarding plane device to directly modify the original aging time included in the installed flow entry. For example, the forwarding plane device modifies the aging time of the flow entry to the ineffective moment or the ineffective duration of the flow entry according to the time modification indicator.

In addition, the ineffective time in the flow rule message may alternatively be duration between the ineffective moment of the flow entry and an effective moment, predicted by the control plane device, of the flow entry. In this embodiment of the present disclosure, because flow entry aging time update can be implemented by using only one piece of signaling, the control plane device can more accurately predict the effective moment of the flow entry, and compared with the prior art, accuracy of the actual ineffective moment of the flow entry is improved.

It can be clearly understood by a person skilled in the art that, for ease and brevity of description, a specific working process and description of the forwarding plane device is not repeated herein, and reference may be made to the corresponding process of the method embodiment.

Embodiment 7

Figure 8:
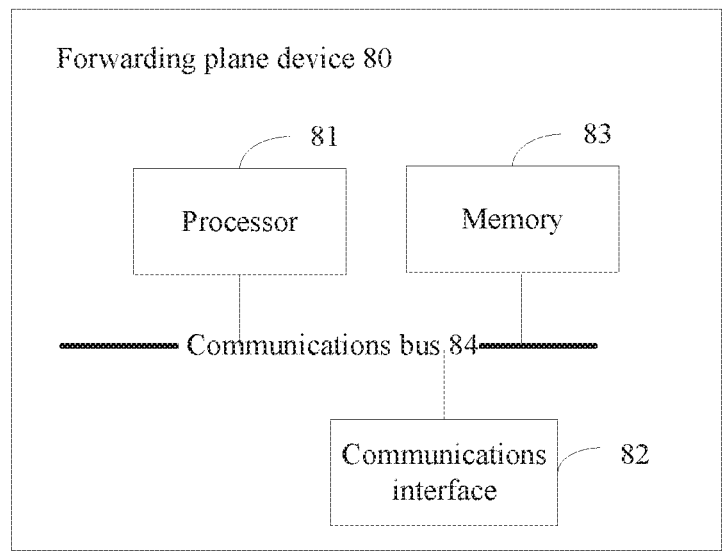
FIG. 8 is a schematic structural diagram of another forwarding plane device according to an embodiment of the present disclosure.

An embodiment of the present disclosure provides another forwarding plane device 80. As shown in FIG. 8, the forwarding plane device 80 includes:

a processor 81, a communications interface 82, a memory 83, and a communications bus 84, where the processor 81, the communications interface 82, and the memory 83 perform mutual communication by using the communications bus 84.

The processor 81 may be a multi-core central processing unit CPU, or an application-specific integrated circuit (ASIC), or one or more integrated circuits configured to implement this embodiment of the present disclosure.

The memory 83 is configured to store program, code, and the program code includes a computer operating instruction and a network flow diagram. The memory 83 may include a high-speed RAM memory, or may include a non-volatile memory, such as at least one disk memory. The memory 83 may also be a memory array. The memory 83 may also be partitioned, and partitions may be combined to form a virtual volume according to a particular rule.

The communications interface 82 is configured to implement a connection and communication between these apparatuses.

The processor 81 is configured to execute the program code in the memory 83, to implement the following operations:

receiving a flow rule message sent by a control plane device, where the flow rule message includes ineffective time of a flow entry and a time type identifier of the ineffective time; and if the time type identifier indicates that the ineffective time is an ineffective moment of the flow entry, performing ineffectiveness processing on the flow entry according to the ineffective moment.

Optionally, the performing ineffectiveness processing on the flow entry according to the ineffective moment includes:

when a current moment of the forwarding plane device is the ineffective moment, performing ineffectiveness processing on the flow entry; or when the forwarding plane device enables the flow entry, determining duration between a current moment and the ineffective moment as first ineffective duration of the flow entry, and when it is detected that the first ineffective duration ends, performing ineffectiveness processing on the flow entry.

Optionally, the flow entry is a flow entry that is already installed on the forwarding plane device but needs to be updated, the flow rule message further includes a time modification indicator, and before the performing ineffectiveness processing on the flow entry, the operations further include:

modifying, according to the time modification indicator, original aging time included in the flow entry to the ineffective moment; or modifying, according to the time modification indicator, original aging time included in the flow entry to the first ineffective duration.

Optionally, the flow rule message further includes effective time of the flow entry, the effective time is an effective moment of the flow entry or effective duration of the flow entry, the effective duration is duration that is between a first moment and the effective moment and that is calculated by the control plane device, and the first moment is a moment prior to the effective moment; and before the performing ineffectiveness processing on the flow entry, the operations further include:

enabling the flow entry when the effective moment of the flow entry arrives, or when it is detected that the effective duration ends.

Optionally, if the time type identifier indicates that the ineffective time is second ineffective duration of the flow entry, ineffectiveness processing is performed on the flow entry when it is detected that the second ineffective duration ends, where the second ineffective duration is duration between the effective moment and the ineffective moment, or the second ineffective duration is duration between the first moment and the ineffective moment.

Optionally, the flow entry is a flow entry that is already installed on the forwarding plane device but needs to be updated, the flow rule message further includes a time modification indicator, and before the performing ineffectiveness processing on the flow entry, the operations further include:

modifying, according to the time modification indicator, original aging time included in the flow entry to the second ineffective duration.

Optionally, after the forwarding plane device receives the flow rule message sent by the control plane device, the operations further include:

verifying the ineffective time and/or the effective time; and when the verification fails, sending a verification failure message to the control plane device.

According to the forwarding plane device, the forwarding plane device receives the flow rule message sent by the control plane device, where the flow rule message includes the ineffective time of the flow entry and the time type identifier of the ineffective time; and when the time type identifier indicates that the ineffective time is the ineffective moment of the flow entry, performs ineffectiveness processing on the flow entry according to the ineffective moment. In this way, when obtaining the ineffective moment of the flow entry, the forwarding plane device may directly perform ineffectiveness processing on the flow entry when the ineffective moment arrives. Alternatively, the forwarding plane device may determine the duration between the current moment at which the flow entry is enabled and the ineffective moment as the ineffective duration of the flow entry, and perform ineffectiveness processing on the flow entry when detecting that the ineffective duration ends. This ensures absolute accuracy of an actual ineffective moment of the flow entry.

Embodiment 8

Figure 9:
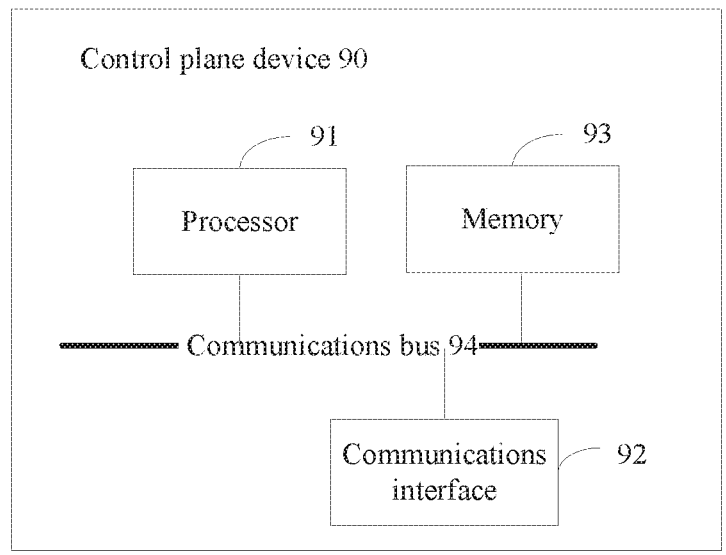
FIG. 9 is a schematic structural diagram of another control plane device according to an embodiment of the present disclosure.

An embodiment of the present disclosure provides another control plane device 90. As shown in FIG. 9, the control plane device 90 includes:

a processor 91, a communications interface 92, a memory 93, and a communications bus 94, where the processor 91, the communications interface 92, and the memory 93 perform mutual communication by using the communications bus 94.

The processor 91 may be a multi-core central processing unit CPU, or an ASIC, or one or more integrated circuits configured to implement this embodiment of the present disclosure.

The memory 93 is configured to store program code, and the program code includes a computer operating instruction and a network flow diagram. The memory 93 may include a high-speed RAM memory, or may include a non-volatile memory, such as at least one disk memory. The memory 93 may also be a memory array. The memory 93 may also be partitioned, and partitions may be combined to form a virtual volume according to a particular rule.

The communications interface 92 is configured to implement a connection and communication between these apparatuses.

The processor 91 is configured to execute the program code in the memory 93, to implement the following operations:

determining ineffective time of a flow entry; and sending a flow rule message to a forwarding plane device, where the flow rule message includes the ineffective time of the flow entry and a time type identifier of the ineffective time, and the time type identifier is used to indicate whether the ineffective time is an ineffective moment of the flow entry or ineffective duration of the flow entry.

Optionally, the flow rule message further includes effective time of the flow entry, the effective time is an effective moment of the flow entry or effective duration of the flow entry, the effective duration is duration that is between a first moment and the effective moment and that is calculated by the control plane device, and the first moment is a moment prior to the effective moment, so that when the effective moment of the flow entry arrives, or when it is detected that the effective duration ends, the forwarding plane device enables the flow entry.

Optionally, the determining, by the control plane device, ineffective time of a flow entry specifically includes:

determining the ineffective duration of the flow entry, where the ineffective duration is duration between the effective moment and the ineffective moment, or the ineffective duration is duration between the first moment and the ineffective moment, so that when the time type identifier indicates that the ineffective time is the ineffective duration, the forwarding plane device performs ineffectiveness processing on the flow entry when detecting that the ineffective duration ends.

Optionally, the flow entry is a flow entry that is already installed on the forwarding plane device but needs to be updated, and the flow rule message further includes a time modification indicator, so that the forwarding plane device modifies, according to the time modification indicator, original aging time included in the flow entry.

According to the control plane device, the control plane device sends the flow rule message to the forwarding plane device, and the flow rule message includes the ineffective time of the flow entry and the time type identifier of the ineffective time. In this way, when the time type identifier indicates that the ineffective time is the ineffective moment of the flow entry, the forwarding plane device may directly perform ineffectiveness processing on the flow entry when the ineffective moment arrives. Alternatively, the forwarding plane device may determine duration between a current moment at which the flow entry is enabled and the ineffective moment as the ineffective duration of the flow entry, and perform ineffectiveness processing on the flow entry when detecting that the ineffective duration ends. This ensures absolute accuracy of an actual ineffective moment of the flow entry.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual requirements to achieve the objectives of the solutions of the embodiments.

In addition, functional units in the embodiments of the present disclosure may be integrated into one processing unit, or each of the units may exist alone physically, or two or more units may be integrated into one unit. The integrated unit may be implemented in a form of hardware, or may be implemented in a form of hardware in addition to a software functional unit.

When the foregoing integrated unit is implemented in a form of a software functional unit, the integrated unit may be stored in a computer-readable storage medium. The software functional unit is stored in a storage medium and includes several instructions for instructing a computer device (which may be a personal computer, a server, a network device, or the like) to perform some of the steps of the methods described in the embodiments of the present disclosure. The foregoing storage medium includes: any medium that can store program code, such as a USB flash drive, a portable hard disk, a read-only memory (ROM), a random access memory (RAM), a magnetic disk, or an optical disc.

Although some preferred embodiments of the present disclosure have been described, a person skilled in the art can make changes and modifications to these embodiments once they learn the basic inventive concept. Therefore, the following claims are intended to be construed as to cover the preferred embodiments and all changes and modifications falling within the scope of the present disclosure.

Obviously, a person skilled in the art can make various modifications and variations to the present disclosure without departing from the spirit and scope of the present disclosure. The present disclosure is intended to cover these modifications and variations provided that they fall within the scope of protection defined by the following claims and their equivalent technologies.

What is claimed is:

1. A method performed by an OpenFlow protocol based forwarding plane device, for timing processing of an OpenFlow protocol flow entry in a flow table in the forwarding plane device, comprising:

receiving, by the forwarding plane device, a flow rule message sent by an OpenFlow protocol based control plane device and comprising ineffective time of the flow entry and a time type identifier of the ineffective time; and when the time type identifier indicates the ineffective time is an ineffective moment of the flow entry, performing, by the forwarding plane device, ineffectiveness processing on the flow entry according to the ineffective moment;

wherein the flow rule message further comprises effective time of the flow entry, the effective time is an effective moment of the flow entry or effective duration of the flow entry, the effective duration is duration that is between a first moment and the effective moment and that is calculated by the control plane device, and the first moment is a moment prior to the effective moment; and before the performing ineffectiveness processing on the flow entry, the method further comprises:

enabling the flow entry when the effective moment of the flow entry arrives, or when it is detected that the effective duration ends;

and wherein when the flow rule message further comprises effective time of the flow entry, if the time type identifier indicates that the ineffective time is second ineffective duration of the flow entry, performing ineffectiveness processing on the flow entry when detecting that the second ineffective duration ends, wherein the second ineffective duration is duration between the effective moment and the ineffective moment, or the second ineffective duration is duration between the first moment and the ineffective moment.

2. The method according to claim 1, wherein when the time type identifier indicates that the ineffective time is an ineffective moment of the flow entry, performing ineffectiveness processing on the flow entry according to the ineffective moment comprises:

when a current moment of the forwarding plane device is the ineffective moment, performing ineffectiveness processing on the flow entry; or determining, by the forwarding plane device when enabling the flow entry, a duration between a current moment and the ineffective moment as a first ineffective duration of the flow entry, and when detecting that the first ineffective duration ends, performing ineffectiveness processing on the flow entry.

3. The method according to claim 2, wherein:

when the time type identifier indicates that the ineffective time is an ineffective moment of the flow entry and the flow entry is a flow entry already installed on the forwarding plane device but needs to be updated, the flow rule message further comprises a time modification indicator; and before performing ineffectiveness processing on the flow entry, the method further comprises:

modifying, according to the time modification indicator, original aging time comprised in the flow entry to the ineffective moment, or modifying, according to the time modification indicator, original aging time comprised in the flow entry to the first ineffective duration.

4. The method according to claim 1, wherein:

when the flow rule message further comprises effective time of the flow entry and the flow entry is a flow entry already installed on the forwarding plane device but needs to be updated, the flow rule message further comprises a time modification indicator; and before performing ineffectiveness processing on the flow entry, the method further comprises:

modifying, according to the time modification indicator, original aging time comprised in the flow entry to the second ineffective duration.

5. The method according to claim 1, wherein after receiving, by the forwarding plane device, a flow rule message sent by an OpenFlow protocol based control plane device, the method further comprises:

verifying the ineffective time and/or the effective time; and when the verification fails, sending a verification failure message to the control plane device.

6. An OpenFlow protocol based forwarding plane device adapted for timing processing of an OpenFlow protocol flow entry in a flow table in the forwarding plane device, comprising:

a receiver, configured to receive a flow rule message sent by an OpenFlow protocol based control plane device and comprising ineffective time of a flow entry and a time type identifier of the ineffective time; and a processor, configured to: when the time type identifier indicates the ineffective time is an ineffective moment of the flow entry, perform ineffectiveness processing on the flow entry according to the ineffective moment, wherein the flow rule message further comprises an effective time of the flow entry, the effective time is an effective moment of the flow entry or effective duration of the flow entry, the effective duration is a duration between a first moment and the effective moment and that was calculated by the control plane device, and the first moment is a moment prior to the effective moment, wherein before performing ineffectiveness processing on the flow entry, the processor is further configured to: enable the flow entry when the effective moment of the flow entry arrives or when it is detected that the effective duration ends, and wherein the processor is further configured to, when the time type identifier indicates that the ineffective time is a second ineffective duration of the flow entry, perform ineffectiveness processing on the flow entry when detecting that the second ineffective duration ends, and wherein the second ineffective duration is a duration between the effective moment and the ineffective moment, or the second ineffective duration is a duration between the first moment and the ineffective moment.

7. The OpenFlow protocol based forwarding plane device according to claim 6, wherein the processor is configured to:

when a current moment of the forwarding plane device is the ineffective moment, perform ineffectiveness processing on the flow entry; or when enabling the flow entry, determine a duration between a current moment and the ineffective moment as a first ineffective duration of the flow entry, and when detecting that the first ineffective duration ends, perform ineffectiveness processing on the flow entry.

8. The OpenFlow protocol based forwarding plane device according to claim 7, wherein:

the flow entry is a flow entry already installed on the forwarding plane device but needs to be updated, the flow rule message further comprises a time modification indicator; and the processor is further configured to:

modify, according to the time modification indicator, original aging time comprised in the flow entry to the ineffective moment; or modify, according to the time modification indicator, original aging time comprised in the flow entry to the first ineffective duration.

9. The OpenFlow protocol based forwarding plane device according to claim 6, wherein:

the flow entry is a flow entry already installed on the forwarding plane device but needs to be updated, the flow rule message further comprises a time modification indicator; and the processor is further configured to:

modify, according to the time modification indicator, original aging time comprised in the flow entry to the second ineffective duration.

10. The OpenFlow protocol based forwarding plane device according to claim 6, wherein the processor is further configured to:

verify the ineffective time and/or the effective time; and when the verification fails, send a verification failure message to the control plane device.

11. An OpenFlow protocol based control plane device adapted for timing processing of an OpenFlow protocol flow entry in a flow table in an OpenFlow protocol based forwarding plane device, comprising:

a processor, configured to determine ineffective time of the flow entry; and a transmitter, configured to send a flow rule message to the forwarding plane device, wherein the flow rule message comprises the determined ineffective time and a time type identifier of the ineffective time, and wherein the time type identifier indicates whether the ineffective time is an ineffective moment of the flow entry or an ineffective duration of the flow entry, wherein the flow rule message further comprises an effective time of the flow entry, wherein the effective time is an effective moment of the flow entry or an effective duration of the flow entry, the effective duration is a duration between a first moment and the effective moment and calculated by the control plane device, and wherein the effective time is used for enablement of the flow entry, and wherein the processor is further configured to determine the ineffective duration of the flow entry, wherein the ineffective duration is a duration between the effective moment and the ineffective moment, or the ineffective duration is a duration between the first moment and the ineffective moment, wherein the ineffective duration is used for ineffectiveness processing on the flow entry.

12. The OpenFlow protocol based control plane device according to claim 11, wherein the flow entry is a flow entry already installed on a forwarding plane device but needs to be updated, and the flow rule message further comprises a time modification indicator, wherein the time modification indicator is used for modification of original aging time comprised in the flow entry.

\* \* \* \* \*